Jan. 7, 1964 W. H. WARD 3,116,939
LOAD DISTRIBUTING LATERALLY FLEXIBLE HITCH
Filed March 8, 1961 2 Sheets-Sheet 1

Inventor
Walter Henry Ward
By
Wolfe, Hubbard, Voit & Osann
Attorneys

Jan. 7, 1964   W. H. WARD   3,116,939
LOAD DISTRIBUTING LATERALLY FLEXIBLE HITCH
Filed March 8, 1961   2 Sheets-Sheet 2
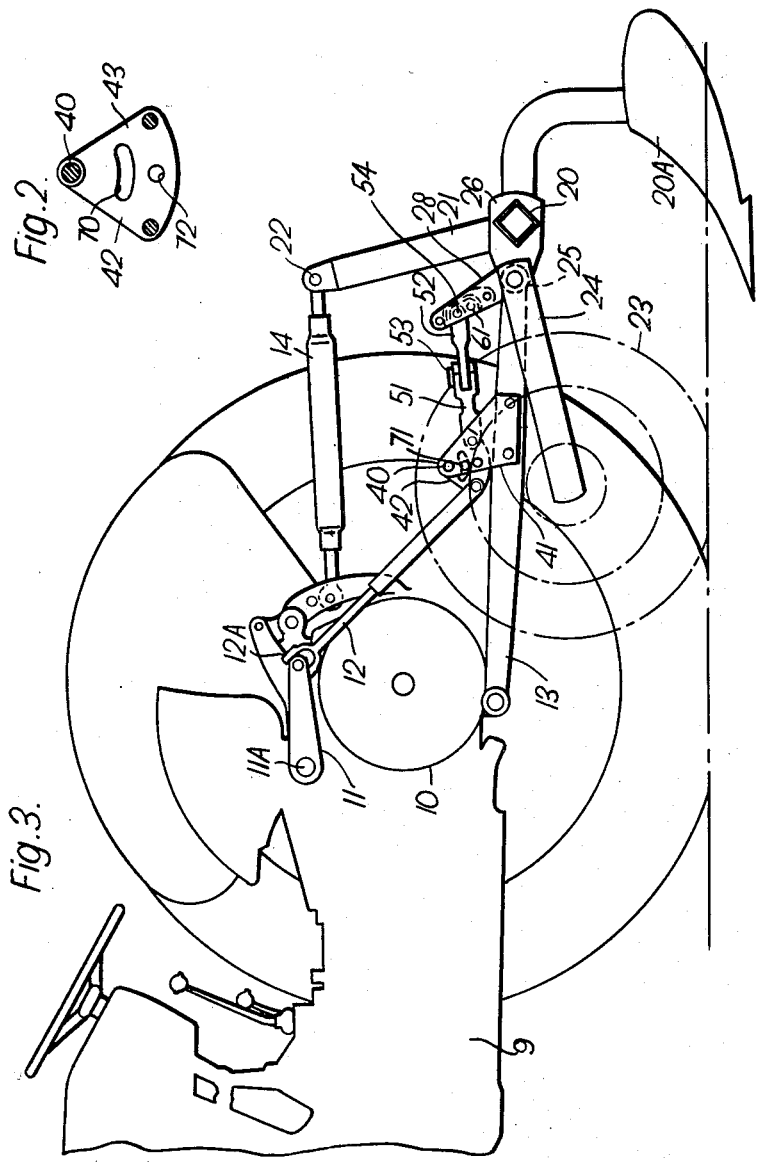
Inventor
Walter Henry Ward
By
Wolfe, Hubbard, Voit & Osann
Attorneys

United States Patent Office 3,116,939
Patented Jan. 7, 1964

1

3,116,939
LOAD DISTRIBUTING LATERALLY FLEXIBLE HITCH
Walter Henry Ward, Vereeniging, Republic of South Africa, assignor to South African Farm Implement Manufacturers Limited, Vereeniging, Republic of South Africa, a corporation of the Republic of South Africa
Filed Mar. 8, 1961, Ser. No. 94,251
Claims priority, application Great Britain Mar. 11, 1960
9 Claims. (Cl. 280—406)

This invention relates to implements adapted for so called "unit mounting" on tractors having power lifts.

In any such tractor, the power lift comprises a hitch linkage including a lower pair of draft links which are raised and lowered under the control of a power unit operating a turnable cross shaft having crank arms which are arranged at opposite sides of the tractor and are connected by drop links to the draft links. The hitch linkage is completed by upper linking means, usually a single central top link. In such tractors it is customary to have provision for automatic "draft control," this effect being derived from the reactive force which is exerted by the soil on the implement and which is transmitted through the linkage to the controller of the power unit. The customary controller is a valve in the hydraulic system of the tractor, the power unit being a hydraulic ram incorporated in said system.

An important characteristic of such unit-mounted implements is that their weight, in some cases assisted by a downward force that is a component of the reactive force of the soil on the implement, imposes on the rear of the tractor a downward force which is highly beneficial to the tractive grip of its rear driving wheels. This downward force is transmitted through the hitch linkage to the tractor.

In any such hitch linkage as hitherto used in practical agriculture, in so far as concerns up and down movements of the implement relatively to the tractor, the two draft links are in effect rigidly interconnected through the cross shaft; that is to say, both links rise and fall in precise unison. This has the disadvantages with a wide implement that it cannot tilt laterally (i.e. cannot tilt about a fore-and-aft axis) to follow the ground contour and that therefore damaging twisting stresses can be set up in the links when working upon irregular or undulating ground.

It is an object of the present invention to provide an improved tractor hitch for a wide, heavy implement which provides for transfer of downward force to the tractor for augmenting the traction of the tractor rear wheels but which nevertheless permits lateral tilting of the implement to follow variations in ground contour. It is another object to provide an improved tractor hitching arrangement for a wide implement in which the implement is largely tractor supported but in which auxiliary ground support is provided at each end of the implement so that the implement is constrained to remain parallel to the surface of the ground, tilting laterally as the ground contour slopes off to the right or to the left.

In this connection it is an object to provide a tractor hitch arrangement for wide implements having supporting wheels and in which only a portion of the total weight and suck of the implement is ground-supported, with a predetermined, and usually major, portion of the downward force being transferred to the tractor for augmenting the force on the tractor rear wheels.

It is another object of the invention to provide a tractor hitch arrangement of the above type in which there is novel provision for effectively adjusting the proportion of the downward force which is borne by the implement wheels and the tractor respectively.

It is a further object to provide a tractor hitch for use with a tractor of the type having a pair of power elevated draft links and which includes novel provision for enabling the links to move differentially upward and downward for accommodating lateral tilt of the implement to the right or to the left. In this connection it is an object to provide a differential linkage arrangement for a tractor of the above type which involves only minor modification of the regular tractor draft links and which may be quickly and easily disabled for use of the same draft links with conventional implements without the differential action or auxiliary ground support.

It is still another object to provide an implement hitch arrangement for a tractor which possesses the above advantages, which is simple and inexpensive construction, easy to put on and take off, which is usable on standard tractors without modification, and which does not require any care or maintenance in the face of hard field usage.

In accordance with the present invention, an implement such as described comprises a wide transverse frame to which one or more agricultural tools can be fitted, connectors on said frame for connecting it to the hitch linkage of a tractor, ground-engaging side wheels interconnected to form a unit which is so mounted on the frame that the wheels can rise and fall in unison relatively to the frame, and a means of connection from said unit to the power lift of the tractor whereby the frame can be raised and lowered relatively to the side wheels, the means of connection including a differential device which is connectable between the draft links of the hitch linkage and with the power lift so as to permit either of said links to rise and fall relatively to the other in order that the frame can tilt about a longitudinal axis.

In further accordance with the invention, the implement includes ground-engaging side wheels which are mounted on the frame of the implement and are interconnected to rise and fall in unison relatively to the frame, and a means of connection from the side wheels to the power lift through a member providing a longitudinal axis about which the frame is tiltable and which rises and falls under the draft control.

The construction is such that the total downward force, consisting of the weight of the implement and hitch and the downward component of the reactive force of the soil, is borne partly by the power lift and partly by the side wheels, the distribution being such that a substantial downward tractive force is applied to the tractor. The arrangement is preferably such that the total downward force exerted by the implement is transmitted mainly to the power lift but partly to the side wheels, and the proportion applied to the side wheels is of a magnitude sufficient to tilt the implement laterally.

The power lift may be utilized for raising and lowering the frame relatively to the side wheels and the lifting force may be applied through a mechanical linkage interposed between the transverse component interconnecting the side wheels and the power lift. The arrangement is such that when the power lift is operated, either automatically under the draft control or under control of the driver of the tractor, to raise the implement the side wheels are forced downwards relatively to the frame, thus raising the frame.

The invention will now be described by way of example with reference to the accompanying drawings in which:

FIG. 2 shows a detail.

FIG. 3 is a side view of the implement and the rear of the tractor on which it is unit-mounted.

Figure 1:
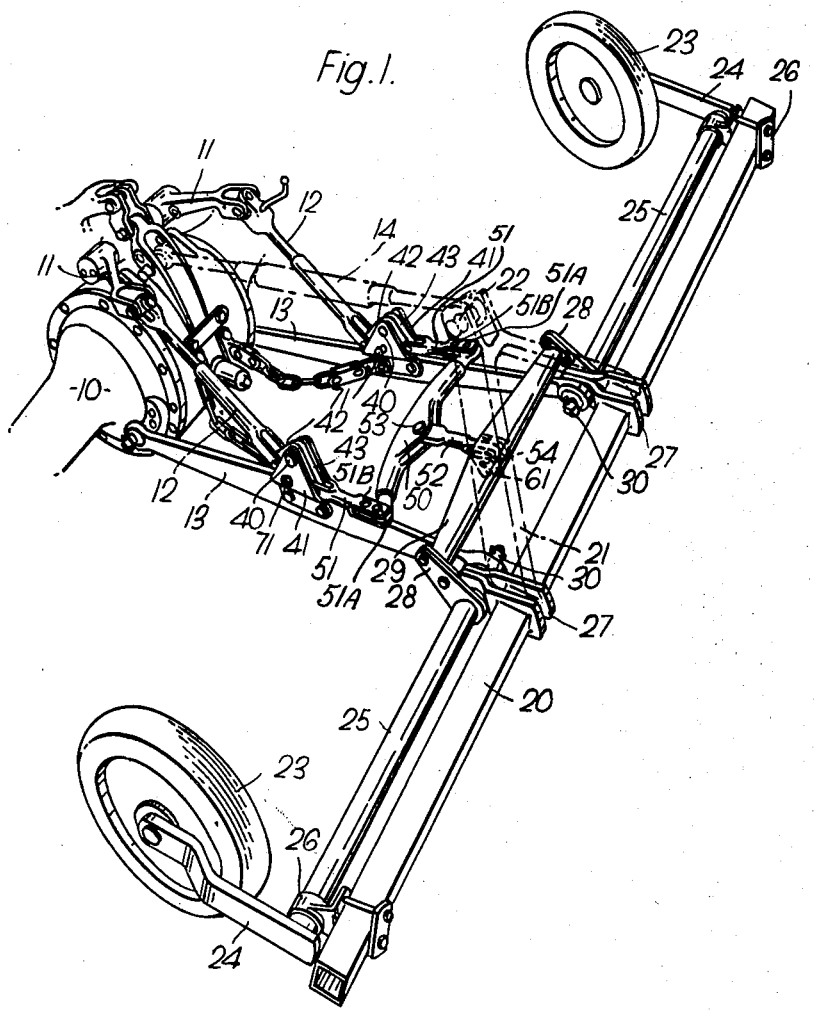
FIGURE 1 is a perspective view showing the frame of an implement unit-mounted on the hitch linkage of a tractor having a power lift subject to automatic draft control.

As shown, the tractor body 9 includes as usual a housing 10 for its differential gear, above which housing are located the customary lift arms 11 secured to opposite ends of a cross shaft 11A which is journalled in bearings on the tractor body 9 so as to be turnable by a power unit, namely a hydraulic ram (not shown), within the body. The lift arms are disposed at opposite sides of the tractor body and drop links 12 are as usual universally jointed to them, at 12A. The hitch linkage of the tractor includes the customary lower draft links 13 and a single top link 14 (set forth by the dot-dash lines), which is the control member through which the draft control forces are transmitted to the hydraulic system of the tractor. These links 13, 14 form the now well known three-point hitch linkage; and the hydraulic ram, cross shaft 11A, lift arms 11 and drop links 12 constitute the power lift, which is applied to the draft links 13.

With reference to the implement, the frame comprises mainly a transverse tool-bar 20 surmounted centrally by a two-legged sub-frame 21, usually known as the A-frame (delineated by the dot-dash lines), the apex of which is provided with a connector 22 by which a ball-joint connection is made with the top link 14. The tool bar, as usual, forms a supporting means for a group of soil-working tools which may be any of various kinds customary in agriculture; in the example, the tools are cultivators for row crops, one of these cultivators being shown at 20A in FIG. 3.

The implement has ground-engaging side wheels 23. These wheels are journalled in bearings at the ends of arms 24 which are rigidly secured to a transverse cranked shaft. The shaft consists of two co-axial torque tubes 25 which are turnable in pairs of bearing brackets 26, 27 secured to the tool bar 20 at opposite sides of the implement. The crank of the transverse shaft consists of a pair of webs 28 secured to the torque tubes and a cross-bar 29 secured at its ends to the webs. Thus, the side wheels 23 and the parts 24, 25, 28, 29 constitute a unit. The arrangement is such that, if turning force is applied to the crank 28, the side wheels will be raised or lowered in unison relatively to the frame, or, conversely, the frame will be lowered or raised relatively to the wheels and therefore to the ground on which they bear.

The inner brackets 27 have connectors 30 by which ball-joint connections are made with the draft links 13. It is important that these connectors 30 shall be co-axial with the torque tubes 25 of the cranked shaft.

In accordance with the present invention the draft links and the ground engaging elements or wheels are supportingly coupled to the tractor power lift mechanism through a force sharing or dividing linkage having means for proportioning the efforts exerted by the latter so that a minor portion of the downward force of the implement (weight and suck) is applied to the ground wheels for keeping them in firm contact with the ground while a major portion of the downward force is borne by the tractor through the draft links for augmenting the traction of the tractor wheels. The linkage may also be aptly considered as a motion-sharing linkage in which the motion of the power lift mechanism produces simultaneously a change in the elevation of the draft links and a change in the position of the wheels relative to the tool bar so that a portion of the load is always assumed by the wheels regardless of the setting of the power lift mechanism. Moreover, the force dividing linkage includes a differential device so that the links are capable of differential movement upwardly and downwardly to accommodate the tilting of the implement to the right or to the left as it follows the ground contours.

In the example, turning force is applicable to the crank 28, 29 by the power lift of the tractor through a mechanical linkage incorporating a differential device. The differential device includes two differential levers which in the example are virtually inverted bell-cranks. These bell-cranks are fulcrumed between the cheeks of brackets 41 on pivot pins 40 passing through the cheeks and they each incorporate front and rear portions 42 and 43 which function as lever arms. The brackets 41 are secured to the draft links 13. The front portion or "arm" 42 of each bell-crank is pivotally connected to the associated drop link 12. It is to be noted therefore that, although the drop links 12 are connected to the draft links 13, they are connected indirectly through the bell-cranks.

The differential device also includes a cross link or yoke 50, which is connected at its ends by links 51 to the rear portions or "arms" 43 of the bell-cranks. The connections between the ends of each link 51 and the associated arm 43 and link 50 are pivotal, with horizontal and vertical axes respectively. The link 50 is connected by a central longitudinal tie member 52 of the cross bar 29 of the crank. The member 52 has a vertical-axis connection by a pivot pin 53 to the cross link 50 and a transverse-axis connection by a pivot pin 54 to the cross bar 29. By virtue of this differential device, the draft links 13 are each able to rise and fall relatively to the other, and therefore the frame of the implement can tilt laterally about a fore-and-aft axis, represented approximately by the tie member 52.

Suppose that the implement is working over ground which falls away at the left hand side. Under the downward forces on the implement it will start to tilt counter-clockwise as viewed from the rear about the right hand wheel, which is momentarily fully loaded. In this action the left draft link 13 will fall relatively to the right draft link, this differential motion being permitted by the differential device. Seeing that, as the ground falls away, the tools considered in the aggregate will work shallower, the draft imposed by the implement on the tractor will decrease. Accordingly, a signal will be transmitted through the top control link 14 to the hydraulic system, the effect of which will be to cause the power lift to lower the drop links 12, until the draft reaches the magnitude for which it has been initially set in the customary manner by the driver of the tractor.

Suppose instead that a rise in the ground is encountered at, say, the left hand side. In this instance, the implement starts to tilt clockwise. As the rise is encountered, the tools considered in the aggregate will work deeper in the soil, thus increasing the draft. Accordingly, the power lift will be caused by the draft control means to pull the drop links 12 upwards, so that the draft will be reduced until the predetermined magnitude is reached.

Thus, it will be seen that by co-operation between the differential device and the draft control means, the implement will tilt in accordance with undulations in the ground and the draft will remain approximately constant. Assuming that the texture of the soil is approximately uniform, seeing that the draft is maintained approximately constant the working depth of the tools will be maintained approximately constant also.

The total downward force exerted by the implement when at work consists of the weight of implement plus the weight of the hitch linkage plus the downward component of the reaction of the soil on the tools (this component being usually known as the "suck"). This total force is transmitted partly to the power lift, through the drop links 12, and partly to the side wheels 23. Seeing that the proportion borne by the power lift is imposed on the tractor and has considerable importance because of the consequential addition to the tractive grip of the rear wheels and seeing that the force on the side wheels need only be great enough to cause the implement to tilt, it is considered that a distribution of 75% to the tractor and 25% to the side wheels will be satisfactory. This distribution is determined by the leverages of the several levers in the mechanical linkage between the cranked shaft and the power lift. Nevertheless, provision is made for adjusting any one or more of these levers.

Thus, in the example, the pivotal connection 54 between the tie member 52 and the crank bar 29 has provision for positional adjustment in order to vary the effective leverage, or "throw," of the crank. An inner position indicated by 61 is provided for selective location of the pivot pin 54 on the bar 29. If the outer position is used, the latter being the position in which the pin 54 is shown, the leverage will be increased, the effect of which will be to transmit a smaller proportion of the downward force to the tractor wheels. Conversely, if the inner position 61 is used, a greater proportion of the force will be transmitted.

Another example of the structure which provides for adjustment of the leverages in the force dividing linkage between the ground engaging elements and the power lift mechanism, are a pair of rear and forward pivot positions 51A and 51B, respectively. If the pivot position were moved from 51A to 51B in effect shortening link 51, the crank bar 29 is turned about its axis to lift the tool bar 20 and thereby increase the proportion of the load on the ground engaging elements 23.

Referring to the bell cranks, each of them is turnable between limit positions. By limiting the available turning of the bell cranks, the implement will be brought into a stabilized position whenever the power lift is operated to raise the implement from the ground to the transport position. Suppose the power lift is operated in this manner. In the first instance, the drop links 12 will pull the bell cranks so that they both turn about their fulcra, the extent of turning varying in accordance with the extent to which the implement is tilted. When both bell cranks have reached their limit positions, the implement then occupies its horizontal setting and thereafter the implement is raised rigidly in this setting to the transport position.

The means provided for limiting the turning of each of the bell cranks 42, 43 is shown in FIG. 2. As shown, the bell-crank is formed with an arcuate slot 70. A pin 71 inserted through the cheeks of each bracket 41 is also inserted through the slot 70 in the bell-crank between the cheeks. The limits of the pin-and-slot action provide the required limits for the turning of the bell-cranks.

When the hitch linkage has to be used for a conventional narrow implement without need for differential movement of the draft links, the bell-cranks can each be locked by insertion of the pin 71 as a locking pin through a hole 72 in the bell-crank.

It is to be noted that the invention here provides more than simultaneous movement of the draft links and the wheels in response to movement at the power lift mechanism. It provides for maintaining a condition of constant equilibrium between the two implement supporting means to insure the desired proportioning of the downward force of the implement under all conditions. Thus in the event that the force at the wheels tends to go below the equilibrium value, this would tend to cause downward movement of the wheels and yielding at the yoke 50. This in turn would tend to cause the draft links to drop slightly to place more of the weight upon the wheels to restore equilibrium. Note that maintenance of the equilibrium condition is not dependent upon any movement taking place at the lift mechanism. A similar analysis may be made for an increase in force at the wheels or for either an increase or a decrease, from the equilibrium value, in the supporting force at the draft links.

The term "tool bar" used in the claims is employed in a general sense to include any element attached to the trailing ends of the draft links to which the movable ground wheels 23 are secured.

I claim as my invention:

1. In a tractor hitch linkage for use with a tractor having a power lift mechanism and for coupling the same to a wide heavy implement, the combination comprising first and second draft links having means for pivoting the same on the rear end of the tractor laterally spaced from one another, a laterally extending tool bar coupled to the trailing ends of the draft links, said tool bar having vertically adjustable ground engaging elements at its ends, and a force dividing linkage for coupling said power lift mechanism to said draft links and to the ground engaging elements, said force dividing linkage being so constructed and arranged that movement of said power lift mechanism is effective simultaneously to change the elevation of the draft links and the position of the ground engaging elements, said force dividing linkage including a differential device effectively interposed between the draft links to permit the draft links to move differentially independently of the power lift mechanism for accommodation of lateral tilting of the tool bar in one direction or the other.

2. In a tractor hitch linkage for use with a tractor having a power lift mechanism and for coupling the same to a wide heavy implement, the combination comprising first and second draft links having means for pivoting the same on the rear end of the tractor laterally spaced from one another, a laterally extending tool bar coupled to the trailing ends of the draft links, said tool bar having vertically adjustable ground engaging elements at its ends, a linkage for coupling said power lift mechanism to said draft links and to the ground engaging elements so that movement of the power lift mechanism is effective to adjust the height of said draft links, said linkage including a differential device coupled to the draft links for permitting differential movement of said draft links sufficient to accommodate lateral tilting of the tool bar in one direction or the other as it follows the contour of the ground.

3. In a tractor hitch linkage for use with a tractor having a power lift mechanism and for coupling the same to a wide heavy implement, the combination comprising first and second draft links having means for pivoting the same on the rear end of the tractor laterally spaced from one another, a laterally extending tool bar coupled to the trailing ends of the draft links, said tool bar having vertically adjustable ground engaging elements at its ends, and a force dividing linkage for coupling said power lift mechanism to said draft links and to the ground engaging elements, said force dividing linkage being so constructed and arranged that force applied by said power lift mechanism is effective simultaneously to raise said draft links and lower said ground engaging elements relative to the tool bar while permitting differential movement of said draft links sufficient to accommodate lateral tilting of the tool bar in one direction or the other.

4. In a tractor hitch linkage for use with a tractor having a power lift mechanism and for coupling the same to a wide heavy implement, the combination comprising first and second draft links having means for pivoting the same on the rear end of the tractor laterally spaced from one another, a laterally extending tool bar coupled to the trailing ends of the draft links, said tool bar having vertically movable ground engaging elements at its ends, a linkage for coupling said power lift mechanism to said draft links for supporting the latter, said linkage including a differential device interconnecting the draft links so that they are free to move differentially thereby to accommodate lateral tilting of the tool bar in one direction or the other, and means having a variable mechanical advantage for interconnecting said coupling linkage and said ground-engaging elements thereby to vary the proportion of the downward force of the implement applied to the ground engaging elements in all settings of the power lift mechanism.

5. In a tractor hitch linkage for use with a tractor having a power lift mechanism and for coupling thereto a wide heavy implement, the combination comprising first and second draft links having means for pivoting the same on the rear end of the tractor laterally spaced from one another, a laterally extending tool bar coupled to the trailing ends of the draft links, ground engaging elements at the ends of said tool bar having adjusting means for simultaneously adjusting the elements upwardly and downwardly with respect to the tool bar, a force dividing linkage for supportingly coupling the draft links and said adjusting means to the power lift mechanism on the tractor so that a portion of the downward force exerted by the implement on the tool bar is supported at the ground engaging elements to keep the latter in contact with the ground while the remainder of the downward force is transmitted to the tractor for augmenting the traction at the tractor rear wheels.

6. In a tractor hitch linkage for use with a tractor having a power lift mechanism and for coupling thereto a wide heavy implement the combination comprising first and second draft links having means for pivoting the same on the rear end of the tractor laterally spaced from one another, a laterally extending tool bar coupled to the trailing ends of the draft links, ground engaging elements at the ends of said tool bar having adjusting means for simultaneously adjusting the elements upwardly and downwardly with respect to the tool bar, a force dividing linkage for supportingly coupling the draft links and said adjusting means to the power lift mechanism on the tractor so that a portion of the downward force exerted by the implement on the tool is supported at the ground engaging elements to keep the latter in contact with the ground while the remainder of the downward force is transmitted to the tractor for augmenting the traction at the tractor rear wheels, said force dividing linkage having means for adjusting the mechanical advantage thereby to change the proportion of the downward force borne by the ground engaging elements and tractor respectively.

7. In a tractor hitch linkage for use with a tractor having a power lift mechanism and for coupling thereto a wide heavy implement the combination comprising first and second draft links having means for pivoting the same on the rear end of the tractor laterally spaced from one another, a laterally extending tool bar coupled to the trailing ends of the draft links, ground engaging elements at the ends of said tool bar having a movable member for simultaneously adjusting the elements upwardly and downwardly with respect to the tool bar, drop links coupled to the power lift mechanism at their upper end and having connections at their lower ends for coupling to the respective draft links for supporting the latter, said connections having provision for relative movement through a predetermined range, and a linkage coupled to the drop links and responsive to the movement at said connections for adjustably positioning the movable adjusting member so that a portion of the downward force exerted by the implement on the tool bar is supported at the ground engaging elements to keep the latter in contact with the ground while the remainder of the downward force is transmitted to the tractor for augmenting the traction at the tracor rear wheels.

8. In a tractor hitch linkage for use with a tractor having a power lift mechanism and for coupling thereto a wide heavy implement, the combination comprising first and second draft links having means for pivoting the same on the rear end of the tractor laterally spaced from one another, a laterally extending tool bar coupled to the trailing ends of the draft links, movable ground engaging elements at the respective ends of the tool bar for positioning the latter with respect to the ground, a common force transmitting member coupled to the ground engaging elements for adjusting the same, means connecting said common force transmitting member to the power lift mechanism on the tractor, said connecting means including a force dividing linkage supportingly coupled to the tractor draft links for individually supporting the same so that the major portion of the downward force exerted by the implement on sadi tool bar is transmitted to the rear wheels of the tractor for augmenting the traction thereof.

9. In a tractor draft linkage for use with a tractor having a power lift mechanism and for coupling thereto a wide heavy implement, the combination comprising first and second draft links having means for pivoting the same on the rear end of the tractor laterally spaced from one another, a laterally extending tool bar coupled to the trailing ends of the draft links, ground engaging elements at the ends of the tool bar for maintaining the tool bar parallel to the ground, drop links having connections at the lower ends thereof for coupling the power lift mechanism to the draft links, said connections providing limited lost motion longitudinally of the draft links, and a yoke member interconnecting the lower ends of the drop links for permitting the draft links to move differentially for taking up the lost motion in opposite directions to accommodate lateral tilting of the tool bar in one direction or the other as the ground engaging elements follow the ground contour.

References Cited in the file of this patent
UNITED STATES PATENTS

| | | |
|---|---|---|
| 2,790,366 | McKinzie | Apr. 30, 1957 |
| 2,915,130 | Todd | Dec. 1, 1959 |
| 3,025,915 | Kelly | Mar. 20, 1962 |